May 7, 1968  W. B. GIST, JR  3,381,474
COMPOUND AIRCRAFT AND PROPULSION SYSTEM
Filed June 10, 1966
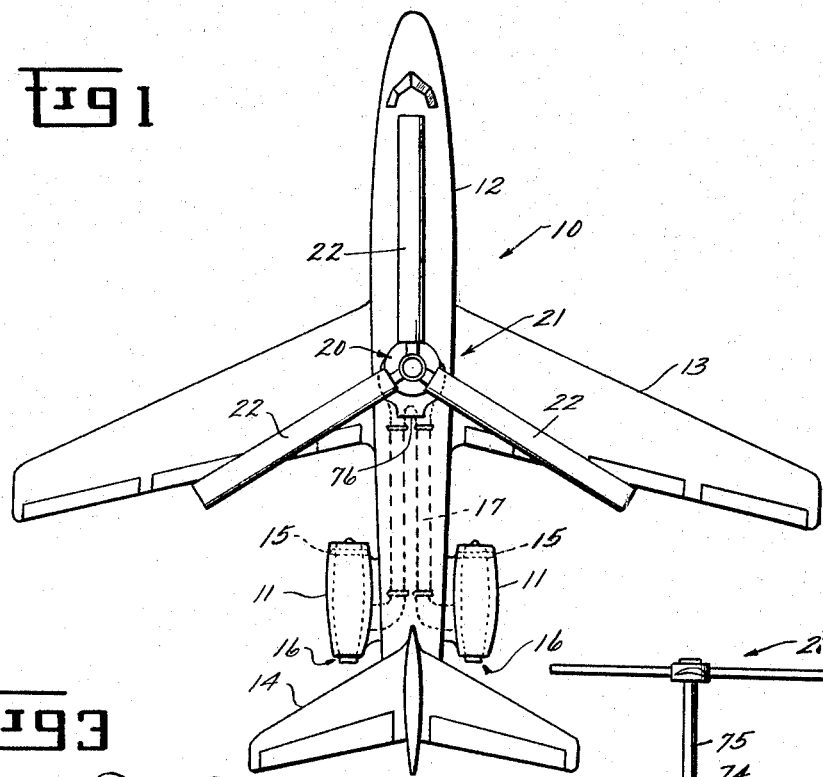
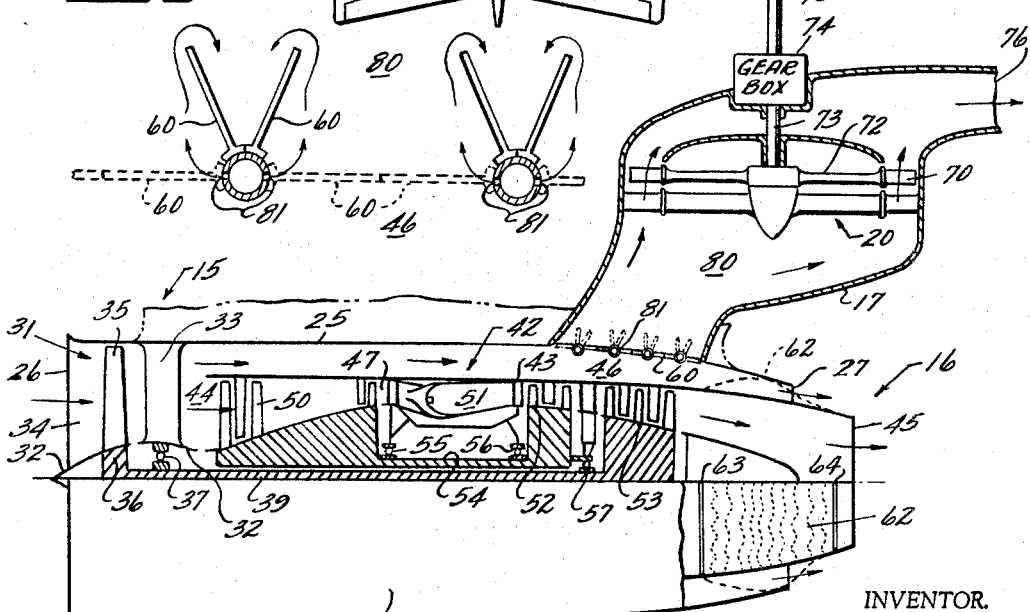
INVENTOR.
WILLIAM B. GIST, JR.
BY
George R. Powers
ATTORNEY United States Patent Office 3,381,474
Patented May 7, 1968

3,381,474
COMPOUND AIRCRAFT AND
PROPULSION SYSTEM
William Bruce Gist, Jr., Lynnfield, Mass., assignor to General Electric Company, a corporation of New York
Filed June 10, 1966, Ser. No. 556,635
9 Claims. (Cl. 60—224)

ABSTRACT OF THE DISCLOSURE

An aircraft propulsion system having two directions of thrust each being mutually perpendicular and including a gas turbine powerplant having a bypass fan assembly for compressing ambient air and a bypass conduit for supplying the compressed air to either a power turbine or an exhaust nozzle. Valves are utilized for controlling the relative amounts of compressed air supplied to the power turbine and exhaust nozzle in order to control the direction of thrust of the aircraft into which the system is installed. A combustion apparatus wherein movable members of the valve act as flame stabilizers is included within the bypass conduit means for increasing the energy level of the compressed air flowing therethrough.

---

This invention relates to a compound aircraft and propulsion system therefor and, more particularly, to an airframe and gas turbine powerplant arrangement in which the total power output of the powerplant may be divided between horizontal and vertical thrust producing devices.

The desirability of combining into a single aircraft the better features of conventional aircraft and vertical take-off and landing—VTOL—aircraft has been long recognized. Such an aircraft would be capable of rising vertically from an extremely small area, such as a heliport, and then converting at a suitable altitude to horizontal flight in the manner of conventional aircraft. After proceeding to its destination at relatively high speed, the aircraft would convert back to the vertical flight mode and descend vertically to a small landing space. Such compound or hybrid aircraft are, of course, particularly adapted for operations in areas devoid of conventional airfields. For example, this type of aircraft has particular utility for flights between the centers of congested urban areas, small landing areas in such metropolitan surroundings being economically feasible and greatly reducing the time generally spent by passengers in traveling to and from distant airports. Such aircraft are also suited for use in isolated and sparsely populated regions where the cost of constructing a conventional airfield would not be justified. Similarly, compound aircraft having vertical and horizontal flight capability have significant military advantages, a primary advantage being that such aircraft may take off and land wherever needed, such as from front line positions in combat zones.

It is an object of this invention to provide an improved compound aircraft and propulsion system therefor.

Another object of this invention is to provide a mechanically simple powerplant arrangement for propelling an aircraft in horizontal and vertical flight modes.

Still another object is to provide for compound aircraft a propulsion system which is both mechanically simple and relatively lightweight.

A further object of this invention is to provide for compound aircraft a propulsion system in which the total power output can be divided in desired proportions between horizontal and vertical thrust producing means.

A still further object is to provide a propulsion system capable of providing the foregoing objects while operating in a highly efficient manner.

Briefly stated, in carrying out the invention in one form, an aircraft propulsion system includes a gas turbine powerplant having a bypass fan assembly for compressing ambient air and bypass conduit means for supplying compressed air from the bypass fan assembly to either a power turbine or an exhaust nozzle. The power turbine drives supplementary thrust producing means, and the entire propulsion system is installed in an airframe such that the direction of thrust produced by compressed air accelerated through the exhaust nozzle is mutually perpendicular to the direction of thrust produced by the supplementary thrust producing means. By further aspects of the invention, valve means are provided for controlling the relative amounts of compressed air supplied to the power turbine and the exhaust nozzle, and combustion apparatus can be included within the bypass conduit means for increasing the energy level of compressed air flowing therethrough to at least one of the thrust producing means.

By still further aspects of the invention, the gas turbine powerplant utilized in one form of the invention is of the front fan type in which a portion of the total air flow through the bypass fan assembly is supplied to a core engine including a fan turbine for driving the bypass fan assembly. The remainder of the total air flow through the bypass fan assembly is directed through the bypass conduit means to the thrust producing means in the manner described above. Also in accordance with the illustrated form of the invention, the supplementary thrust producing means is a helicopter-type rotor assembly installed in the airframe to produce vertically directed thrust, and the exhaust nozzle is disposed such that compressed air accelerated therethrough exerts horizontally directed thrust on the airframe.

While the invention is distinctly claimed and particularly pointed out in the claims appended hereto, the invention, both as to organization and content, will be better understood and appreciated, along with other objects and features thereof, from the following detailed description when taken in conjunction with the drawing, in which:

FIG. 1 is a horizontal plan view of an aircraft having horizontal and vertical thrust producing means powered in accordance with the present invention;

FIG. 2 is a schematic cross-sectional illustration of one of the gas turbine powerplants of FIG. 1; and FIG. 3 is a detailed view of combustion apparatus for optional bypass burning.

An aircraft indicated generally by the numeral 10 is illustrated by FIG. 1, the aircraft 10 being powered by a propulsion system including a pair of gas turbine powerplants 11 mounted on horizontally opposite sides of the fuselage 12 of the airframe intermediate the wings 13 and the tail assembly 14. More particularly, each powerplant 11 includes a bypass fan assembly 15 for compressing ambient air and an exhaust nozzle 16 through which the compressed air can be accelerated to produce forwardly directed horizontal thrust on the aircraft 10. In addition, valve means not illustrated by FIG. 1 and conduits 17 are provided for diverting all or a portion of the compressed air to a common power turbine 20 for driving a helicopter-type rotor assembly 21 having blades 22 to produce vertical thrust on the aircraft 10.

While the specific details of the propulsion system of this invention will be described at a later point in this specification, it will now be obvious that, by suitably controlling the relative amounts of compressed air supplied to the exhaust nozzles 16 and the power turbine 20, the aircraft 10 may be made to operate either as a conventional aircraft in which horizontal thrust only is exerted on the airframe by the propulsion system or as a vertical take-off and landing—VTOL—aircraft in which vertical thrust only is provided. Furthermore, by sharing the total flow of compressed air between the exhaust nozzles 16 and the power turbine 20 in desired proportions, the aircraft 10 may be made to operate as a short take off and landings—STOL—aircraft, horizontal and vertical thrust both being exerted on the airframe at the same time. In the following description, one form of the present invention will be described in detail.

With reference now to FIG. 2, one of the gas turbine powerplants 11 is illustrated in cross-section, the powerplant 11 including a cylindrical casing 25 having at its upstream end an annular inlet 26 and at its downstream end an annular exhaust nozzle 27. Adjacent the upstream end of the casing 25 is the bypass fan assembly 15 for compressing ambient air entering the powerplant through the inlet 26. More particularly, the bypass fan assembly 15 includes a bypass fan rotor assembly 31 and stator structure, the stator structure comprising an inner fairing 32 coaxially supported with respect to and from the casing 25 by a plurality of radial stator vanes 33. The inner fairing 32 thus cooperates with the casing 25 to form the annular inlet 26 and an annular passageway 34 extending downstream from the inlet 26, the fan rotor assembly 31 including a row of compressor blades 35 spanning the passageway 34. The compressor blades 35 are peripherally mounted on a rotor disc 36 which is rotatably supported by a bearing arrangement 37 and is driven by a shaft 39.

Still referring to FIG. 2, the powerplant 11 further includes a core engine 42 having a cylindrical outer surface 43 coaxially mounted within the casing 25, the core engine 42 having an annular inlet 44 at its upstream end and an outlet 45 at its downstream end. The casing 25 and the outer surface 43 of the core engine 42 cooperate to form therebetween an annular bypass passageway 46 interconnecting the passageway 34 at the upstream end of the core engine 42 and the exhaust nozzle 27 at the downstream ends of the casing 25 and the core engine. The core engine 42 includes an axial passageway 47 interconnecting the inlet 44 and the outlet 45, and a compressor 50, a combustor 51, a gas generator turbine 52, and a fan turbine 53 are connected in serial flow relationship by the passageway 47. The compressor 50, the combustor 51, and the gas generator turbine 52 comprise a high energy gas producing means for supplying hot combustion gases to the fan turbine 53, the turbine 52 driving the compressor 50 through a hollow drive shaft 54 rotatably supported by bearings 55 and 56. The fan turbine 53 is secured to the shaft 39 so as to drive the fan rotor assembly 31, the shaft 39 being coaxially supported for rotation within the hollow shaft 54 by bearings 57 and 37.

As illustrated by FIG. 2, ambient air flows through the annular inlet 26 to the fan passageway 34 where the air is compressed by the bypass fan assembly 15. By the conduit means provided by the powerplant structure as just described, a portion of the compressed air is supplied to the compressor 50 to support combustion within the core engine 42 and thereby drive the bypass fan rotor assembly 31 while the remainder of the air is directed through the passageway 46 to the exhaust nozzle 27 where it is accelerated to atmosphere. By expanding the compressed air through the exhaust nozzle 27, thrust is produced on the powerplant 11 and, hence, on the aircraft 10. With the powerplants 11 mounted as illustrated by FIG. 1, this thrust is forwardly directed in a horizontal plane.

In some instances, however, vertical thrust rather than horizontal thrust may be desired. To provide vertical thrust, valve means are provided for directing all or a desired portion of the compressed air in the bypass passageway 46 through the conduit 17 to the power turbine 20 to drive the helicopter-type rotor assembly 21. As illustrated by FIG. 2, this valve means includes a plurality of doors 60 in the casing 25 intermediate the bypass fan assembly 15 and the exhaust nozzle 27. The doors 60 are movable through a range of positions, the range including as end positions the fully closed positions illustrated by solid lines and the fully open positions illustrated by broken lines. It will, of course, be obvious that in the fully closed positions the doors 60 prevent flow through the conduit 17 and that in the fully open positions the doors 60 permit substantially unimpeded flow of compressed air through the conduit 17 to the power turbine 20. The amount of flow restriction can, of course, be varied by selective positioning within the range of positions.

In addition to the doors 60, the valve means includes an expansible diaphragm 62 circumferentially surrounding the outer surface 43 of the core engine 42 at the exhaust nozzle 27, the diaphragm 62 being hermetically sealed to the outer surface 43 at its upstream and downstream ends 63 and 64, respectively. As in the case of the doors 60, the diaphragm 62 is movable through a range of positions including a deflated position as illustrated by solid lines in which the diaphragm 62 is contiguous with the outer surface 43 and a fully inflated position as illustrated by broken lines in which the diaphragm 62 extends entirely across the exhaust nozzle 27 to prevent flow therethrough. The amount of flow restriction through the exhaust nozzle 27 can also be varied by selective positioning of the diaphragm 62 within its range of positions.

To provide vertical thrust only, the doors 60 are moved to their fully open positions and the diaphragm 62 is inflated to its fully inflated position as illustrated by broken lines in FIG. 2. With the doors 60 and the diaphragm 62 positioned in this manner, the entire flow of bypass air is directed through the conduit 17 to the power turbine 20 where the air impinges on the turbine buckets 70 to drive the turbine rotor 72 and a shaft 73 secured thereto. The high rotary speed of the shaft 73 is reduced by a gearbox 74, and output shaft 75 driving the rotor assembly 21. After driving the power turbine 20, the spent air is discharged through an outlet 76.

As discussed previously, horizontal thrust only is produced with the doors 60 and the diaphragm 62 positioned as illustrated by solid lines in FIG. 2, the doors 60 being fully closed and the diaphragm 62 being completely deflated. If, however, a combination of vertical and horizontal thrust is desired, the doors 60 and the diaphragm 62 may be moved within the ranges of positions to control the relative amounts of compressed air supplied to the exhaust nozzle 27 and the power turbine 20. Various control arrangements for positioning the doors 60 and the diaphragm 62 in accordance with the wishes of the pilot will readily occur to those skilled in the art, and such arrangements are therefore not described in detail herein.

To provide even greater vertical thrust, combustion apparatus 80 may be provided in the conduit 17 for burning fuel within the conduit 17 to further increase the energy level of the gases driving the power turbine 20. As illustrated by FIG. 3, the combustion apparatus 80 includes fuel orifices 81 located in conjunction with the doors 60 such that the doors 60 can serve as flameholders to maintain combustion within the conduit 17. If desired, combustion could also be provided in the passageway 46 to increase the energy level of gases supplied to the exhaust nozzle 27, thereby increasing the horizontal thrust produced by the propulsion system. In such an event, however, the diaphragm 62 may have to be replaced by other suitable valve means in the event that the temperatures produced by the combustion process are greater than can be withstood by the elastic diaphragm.

At this point, it will be obvious to those skilled in the art that the propulsion system of this invention provides a great amount of flexibility. By use of auxiliary burning as just described, the output of the supplementary thrust producing means, the rotor assembly 21, can be increased substantially without requiring any changes in the basic powerplants 11. Other modifications will also occur to those skilled in the art. For example, it may be desired to size the conduits 17 and the power turbine 20 to accommodate only a fraction of the total bypass flow of compressed air in the event that lightweight and only modest levels of vertical thrust are desired. In such an event, the exhaust nozzle 27 would remain open to flow at all times.

While it is believed to be obvious at this point, the mode of operation of the compound aircraft 10 will now be described. Assuming that a vertical takeoff is desired, the doors 60 will be opened and the diaphragm 62 will be inflated to direct the entire flow of bypass compressed air through the conduits 17 to the power turbine 20 to drive the rotor assembly 21. Because of the vertical thrust produced by the rotor assembly 21, the aircraft 10 will rise vertically. When a suitable height is reached, the doors 60 will be closed slowly, and the diaphragm 62 will be simultaneously deflated slowly so that a portion of the compressed ambient air will drive the rotor assembly 21 while another portion is exhausted through the exhaust nozzle 27 to produce horizontal thrust. As a result, the aircraft 10 will begin to move forward while still being supported by the rotor assembly 21. When a horizontal speed sufficient for the wings 13 to provide adequate lift is reached, the doors 60 may be entirely closed and the diaphragm 62 completely deflated. At such times, the aircraft 10 is propelled entirely by the powerplants 11 in the manner of conventional bypass engines, it being understood of course that some additional thrust will normally be provided by exhaust products being discharged through the outlet 45 of the core engine 42. To convert from relatively high speed flight to vertical flight for landing, the above-described procedure is revised.

It will, of course, be obvious that the entire sequence of operations described above need not be followed in all situations. For example, if a short take-off or landing, as opposed to a vertical take-off or landing, is desired, the doors 60 may be opened and the diaphragm 62 may be deflated so that both horizontal and vertical thrust are provided.

From the foregoing, it will be appreciated that this invention provides an improved compound aircraft and propulsion system therefor in which the propulsion system is relatively simple and lightweight, not requiring auxiliary equipment such as supplementary turbines, ducts, valves, etc.

It will be understood that the invention is not limited to the specific details of the construction and arrangement of the particular embodiments illustrated and described herein. It is therefore intended to cover in the appended claims all such changes and modifications which may occur to those skilled in the art without departing from the true spirit and scope of the invention.

What is claimed as new and is desired to secure by Letters Patent of the United States is:

1. An aircraft propulsion system comprising:
   a substantially cylindrical casing having an upstream end and a downstream end,
   a bypass fan for compressing ambient air including a bypass fan rotor assembly mounted for rotation within said first casing at the upstream end thereof,
   a core engine having a substantially cylindrical outer surface coaxially disposed within said casing, said core engine having an upstream end adjacent said bypass fan rotor assembly and a downstream end in substantially axial alignment with the downstream end of said casing,
   said casing and the outer surface of said core engine forming therebetween an annular bypass passageway communicating with said bypass fan and terminating at the downstream ends of said casing and said core engine in an annular exhaust nozzle through which ambient air compressed by said bypass fan may be accelerated to the produce thrust,
   said core engine including a compressor, a combustor, a gas generator turbine, and a fan turbine connected in serial flow arrangement by an annular fluid passageway communicating with said bypass fan at the upstream end of said core engine and with atmosphere at the downstream end of said core engine.
   means supporting said compressor, said gas generator turbine, and said fan turbine for rotation,
   a first hollow drive shaft interconnecting said gas generator turbine and said compressor for transmitting power to said compressor,
   a second drive shaft interconnecting said fan turbine and said bypass fan rotor assembly for transmitting power to said bypass fan, said second drive shaft extending coaxially through the hollow interior of said first drive shaft,
   a power turbine connected to a load,
   means supporting said power turbine for rotation,
   means forming a passageway interconnecting said bypass passageway at a point intermediate said bypass fan and said exhaust nozzle and said power turbine for supplying compressed ambient air to said power turbine to drive said power turbine and thereby transmit power to the load,
   combustion means in the passageway interconnecting said bypass passageway and said power turbine for increasing the energy level of compressed ambient air flowing through said passageway,
   and valve means for controlling the relative amounts of compressed ambient air supplied to said power turbine and said exhaust nozzle,
   including movable means for controlling the amount of air supplied to said power turbine and for stabilizing the flame in said combustion means.

2. An aircraft propulsion system as defined by claim 1 which said movable means include a plurality of door means having a first position closing the passageway interconnecting said bypass passageway and said power turbine and a second position acting to stabilize the flame in said combustion means.

3. An aircraft propulsion system comprising:
   at least one gas turbine powerplant having a bypass fan assembly for compressing ambient air,
   a power turbine,
   an exhaust nozzle,
   a first conduit means having first and second branches connecting said fan assembly to said power turbine through said first branch and said exhaust nozzle through said second branch,
   combustion apparatus in said first conduit means for increasing the energy level of the compressed ambient air flowing through at least one of said first and second branches,
   valve means in said first conduit means for controlling the relative amount of compressed ambient air supplied to said power turbine through said first branch and said exhaust nozzle through said second branch, wherein said valve means for said first branch includes movable means having a first position closing said first branch and a second position acting to stabilize the flame in said combustion apparatus.

4. An aircraft propulsion system as defined by claim 2 in which said valve means comprises:
   first valve apparatus in said bypass passageway adjacent said exhaust nozzle,
   second valve apparatus in said passageway interconnecting said bypass passageway and said power turbine,
   said first valve apparatus and said second valve apparatus each being movable through a range of positions including a first end position permitting substantially unimpeded flow through the respective passageway and a second and position preventing flow through the respective passageway, and control means for positioning said first valve apparatus and said second valve apparatus within said ranges of positions so as to control the relative amounts of accelerated ambient air supplied to said power turbine and said exhaust nozzle.

5. An aircraft propulsion system as defined by claim 4 the load driven by said power turbine is a supplementary thrust producing means, said supplementary thrust producing means and said exhaust nozzle being disposed such that the directions of thrust produced by said supplementary thrust producing means and by accelerated ambient air flowing through said exhaust nozzle are mutually perpendicular.

6. A compound aircraft comprising an airframe and an aircraft propulsion system as defined by claim 5 formed integrally therewith, said exhaust nozzle being disposed such that horizontal thrust is produced on said airframe by accelerated ambient air flowing therethrough and said supplementary thrust producing means being disposed to produce vertical thrust on said airframe.

7. An aircraft propulsion system as defined by claim 3 in which said gas turbine powerplant comprises:
a gas generator for producing high energy motive fluid, said bypass fan assembly for compressing ambient air, a fan turbine,
drive means interconnecting said fan turbine and said bypass fan assembly,
and second conduit means interconnecting said gas generator and said fan turbine for supplying high energy motive fluid to said fan turbine to drive said fan assembly and thereby compress ambient air.

8. An aircraft propulsion system as defined by claim 7 including third conduit means interconnecting said bypass fan assembly and said gas generator for supplying a portion only of the compressed ambient air to said gas generator, the remaining portion of the accelerated ambient air flow through said first conduit means.

9. An aircraft propulsion system as defined by claim 8 in which said gas generator comprises:
a compressor, a combustor, and a gas generator turbine arranged in serial flow relationship,
and a hollow drive shaft interconnecting said gas generator turbine and said compressor,
said third conduit means interconnecting said bypass fan assembly and said compressor, and said second conduit means interconnecting said gas generator turbine and said fan turbine,
and said drive means interconnecting said fan turbine and said bypass fan assembly comprising a drive shaft extending coaxially through the interior of said gas generator drive shaft.

References Cited

UNITED STATES PATENTS

| | | | |
|---|---|---|---|
| 2,650,666 | 9/1953 | Dorand | 60—224 |
| 2,899,149 | 8/1959 | Breguet | 60—226 |
| 3,245,218 | 4/1966 | Marchant | 60—39.72 |
| 3,263,416 | 8/1966 | Bill | 60—226 |
| 3,264,822 | 8/1966 | Lane | 60—39.72 |

CARLTON R. CROYLE, *Primary Examiner.*

MARK NEWMAN, *Examiner.*

D. HART, *Assistant Examiner.*